(12) United States Patent
Dong

(10) Patent No.: US 9,274,353 B1
(45) Date of Patent: Mar. 1, 2016

(54) ELECTROOPTIC SILICON MODULATOR WITH ENHANCED BANDWIDTH

(71) Applicant: Kotura, Inc., Monterey Park, CA (US)

(72) Inventor: Po Dong, Arcadia, CA (US)

(73) Assignee: Kotura, Inc., Monterey Park, CA (US)

( * ) Notice: Subject to any disclaimer, the term of this patent is extended or adjusted under 35 U.S.C. 154(b) by 0 days.

(21) Appl. No.: 14/282,975

(22) Filed: May 20, 2014

Related U.S. Application Data

(62) Division of application No. 12/228,671, filed on Aug. 13, 2008, now abandoned.

(51) Int. Cl.
   *G02F 1/035* (2006.01)
   *G02F 1/01* (2006.01)
   *G02F 1/225* (2006.01)
   *G02B 6/293* (2006.01)

(52) U.S. Cl.
   CPC .............. *G02F 1/0121* (2013.01); *G02F 1/225* (2013.01); *G02B 6/29338* (2013.01)

(58) Field of Classification Search
   CPC ..................................................... G02B 6/29338
   See application file for complete search history.

(56) References Cited

U.S. PATENT DOCUMENTS 6,947,642 B2 * 9/2005 Yamazaki ................... 385/39

OTHER PUBLICATIONS

Gardes, F., et al., "A sub-micron depletion-type photonic modulator in Silicon on Insulator," Opt. Express 13, 8845-8854 (2005).

Green, W., et al, "Ultra-compact, low RF power, 10 Gb/s silicon Mach-Zehnder modulator," Optics Express 15, pp. 17106-17113 (2007).
Liu, A., et al, "High-speed optical modulation based on carrier depletion in a silicon waveguide," Opt. Express 15, 660-668 (2007).
Liu, R., et al, "A high-speed silicon optical modulator based on a metal-oxide-semiconductor capacitor," Nature 427, 615-618 (2004).
Soref, R. A., et al., "Electrooptical effects in silicon," IEEE J. Quantum Electron. QE23, 123-129 (1987).
Spector, S. J., et al, "High-speed silicon electro-optical modulator that can be operated in carrier depletion or carrier injection mode," CLEO/QELS 2008 Paper CHF4, San Jose, May 6-8, 2008.
Xu, Q., et al, "12.5 Gbit/s carrier-injection-based silicon micro-ring silicon modulators," Opt. Express 15, 430-436 (2007).

(Continued)

*Primary Examiner* — Uyen Chau N Le
*Assistant Examiner* — Chad Smith
(74) *Attorney, Agent, or Firm* — Gavrilovich, Dodd & Lindsey, LLP

(57) ABSTRACT

The modulator includes a ring resonator having a phase modulator that tunes blocked wavelengths within phase modulator bandwidths. The blocked bands include blocked wavelengths at which the intensity of an output light signal is minimized. Each of the blocked bands is associated with the phase modulator bandwidth within which the blocked wavelength is tuned. A bandwidth shifting device is configured to shift a selection of wavelengths that falls within each of the phase modulator bandwidths. Electronics are configured to operate the bandwidth shifting device so as to shift the phase modulator bandwidths from a location where a first target wavelength falls within a first one of the phase modulator bandwidths to a location where a second target wavelength falls within a second one of the phase modulator bandwidths.

18 Claims, 5 Drawing Sheets

(56) References Cited

OTHER PUBLICATIONS

Xu, Q., et al, "Micrometre-scale silicon electro-optic modulator," Nature 435, 325-327 (2005).

Zheng, D. W., et al, "Design of a 10 GHz Silicon modulator based on a 0.25 µm CMOS process: A silicon photonic approach", Proceedings of SPIE, the International Society for Optical Engineering, vol. 6125, pp. 61250E.1-61250E.10 (2006).

* cited by examiner

ELECTROOPTIC SILICON MODULATOR WITH ENHANCED BANDWIDTH

RELATED APPLICATIONS

This application is a Divisional of U.S. patent application Ser. No. 12/228,671, filed on Aug. 13, 2008, entitled "Electrooptic Silicon Modulator with Enhanced Bandwidth," and incorporated herein in its entirety.

GOVERNMENT SUPPORT

This invention was made with Government support under Agreement No. HR0011-08-9-0001 awarded by DARPA. The Government has certain rights in this invention.

FIELD

The present invention relates to optical devices and more particularly to optical modulators.

BACKGROUND

High-speed optical modulators are desirable for a variety of telecommunications applications. Ring resonators are often desirable modulators due to their low power consumption, small sizes, and fast modulation speeds. These modulators have a loop waveguide optically coupled with a bus (input/output) waveguide. The modulator includes a phase modulator that phase modulates a light signal in the ring resonator. This phase modulation changes the phase difference between the light signal in the loop waveguide and the light signal in the bus waveguide. The phase difference can be controlled so as to create constructive interference between the light signal in the loop waveguide and the light signal in the bus waveguide. When constructive interference is achieved, the intensity of the light signal output from the bus waveguide decreases from the intensity that results when constructive interference is not achieved. As a result, the phase modulation of the light signal in the loop waveguide can be used to intensity modulate the output from the loop waveguide.

The band of wavelengths that can be effectively intensity modulated by the phase modulator is the phase modulator bandwidth for the ring resonator. The phase modulator bandwidth is undesirably low for most practical applications. As a result, some ring resonators include temperature control devices that can be employed to tune the bandwidth of the ring resonator. This tuning generally shifts the wavelengths that fall within the bandwidth but does not substantially increase or decrease the range of wavelengths that fall within the phase modulator bandwidth. However, the range of this bandwidth shift is often undesirably low. As a result, the total range of wavelengths that can be modulated by ring resonators is often undesirably low. For these reasons, there is a desire to increase the range of wavelengths that can be modulated by ring a resonator.

SUMMARY

The modulator includes a ring resonator having a phase modulator that tunes blocked wavelengths within phase modulator bandwidths. The blocked bands include blocked wavelengths at which the intensity of an output light signal is minimized. Each of the blocked bands is associated with the phase modulator bandwidth within which the blocked wavelength is tuned. A bandwidth-shifting device is configured to shift a selection of wavelengths that falls within each of the phase modulator bandwidths. Electronics are configured to operate the bandwidth shifting device so as to shift the phase modulator bandwidths from a location where a first target wavelength falls within a first one of the phase modulator bandwidths to a location where a second target wavelength falls within a second one of the phase modulator bandwidths.

An embodiment of the modulator includes a bus waveguide configured to carry an input light signal to a location where the bus waveguide is optically coupled with a loop waveguide. The bus waveguide is optically coupled with the loop waveguide such that at least a portion of the input light signal can enter the loop waveguide and serve as a loop light signal. The bus waveguide is also configured to carry an output light signal away from the location where the bus waveguide is optically coupled with the loop waveguide. The modulator also includes a phase modulator for phase modulating the phase difference between the loop light signal and the input light signal. The phase modulator is configured to modulate the phase differences such that blocked wavelengths are tuned within phase modulator bandwidths and such that each of the blocked wavelengths is tuned within a different one of the phase modulator bandwidths. The blocked wavelengths are wavelengths at which the intensity of the output light signal is minimized. A bandwidth-shifting device is configured to shift the selection of wavelengths that falls within each of the phase modulator bandwidths. Electronics are configured to operate the bandwidth shifting device so as to shift the phase modulator bandwidths from a location where a first target wavelength falls within a first one of the phase modulator bandwidths to a location where a second target wavelength falls within a second one of the phase modulator bandwidths, the first phase modulator bandwidth being different the second phase modulator bandwidth.

Methods of operating the modulator are also disclosed.

BRIEF DESCRIPTION OF THE FIGURES

FIG. 1A is a perspective view of the optical device.

FIG. 1B is a cross section of the optical device shown in FIG. 1A taken along the line labeled B in FIG. 1A.

DESCRIPTION

An embodiment of the modulator includes a bus waveguide configured to carry an input light signal to a location where the bus waveguide is optically coupled with a loop waveguide. The bus waveguide is optically coupled with the loop waveguide such that at least a portion of the input light signal can enter the loop waveguide and serve as a loop light signal. The bus waveguide is also configured to carry an output light signal away from the location where the bus waveguide is optically coupled with the loop waveguide.

The modulator also includes a phase modulator for phase tuning the phase difference between the loop light signal and the input light signal. The phase modulator is configured to tune this phase difference such that blocked wavelengths are each tuned within a different phase modulator bandwidth. The blocked wavelengths are wavelengths at which the intensity of the output light signal is minimized.

The modulator also includes a bandwidth-shifting device configured to tune the selection of wavelengths that falls within each of the phase modulator bandwidths.

The modulator also includes electronics configured to tune the blocked bands (or blocked wavelengths) so more than one of the blocked bands is used to modulate the output light signals. For instance, the electronics can operate the bandwidth shifting device so as to shift the phase modulator bandwidths from a location where a first target wavelength falls within a first one of the phase modulator bandwidths to a location where a second target wavelength falls within a second one of the phase modulator bandwidths. The ability to use more than one of the phase modulator bandwidths for intensity modulation increases the total range of wavelengths that can be intensity modulated by the modulator. As a result, the modulator has a substantially increased range of wavelengths that can be modulated while still retaining the low power consumption, small sizes, and fast modulation speeds associated with prior ring resonators.

Figure 1A:
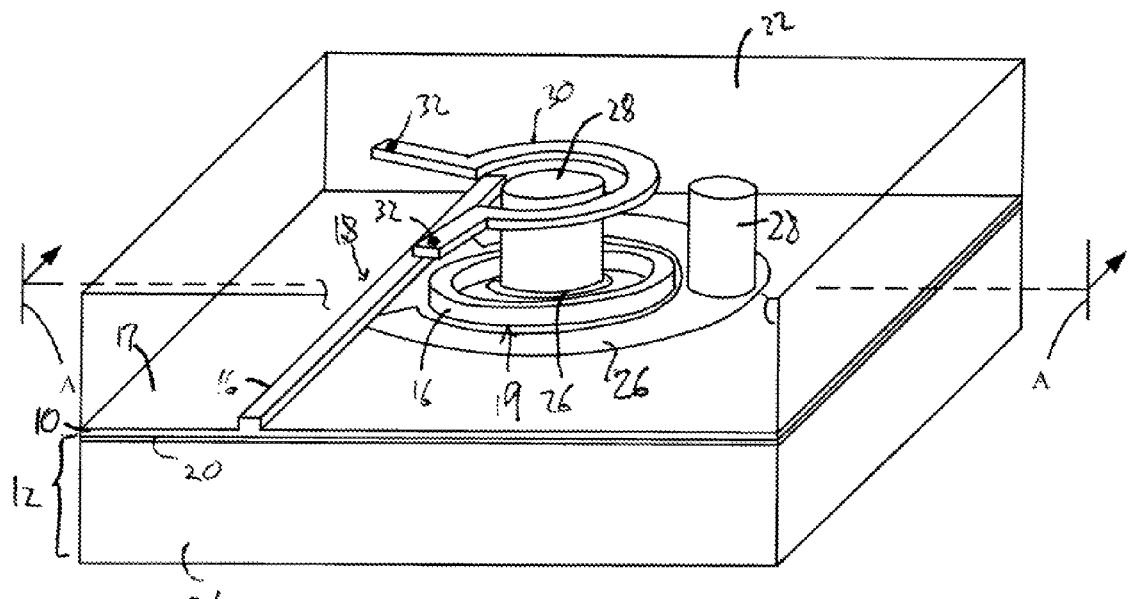
FIG. 1A and FIG. 1B illustrate an optical device.
Figure 1B:
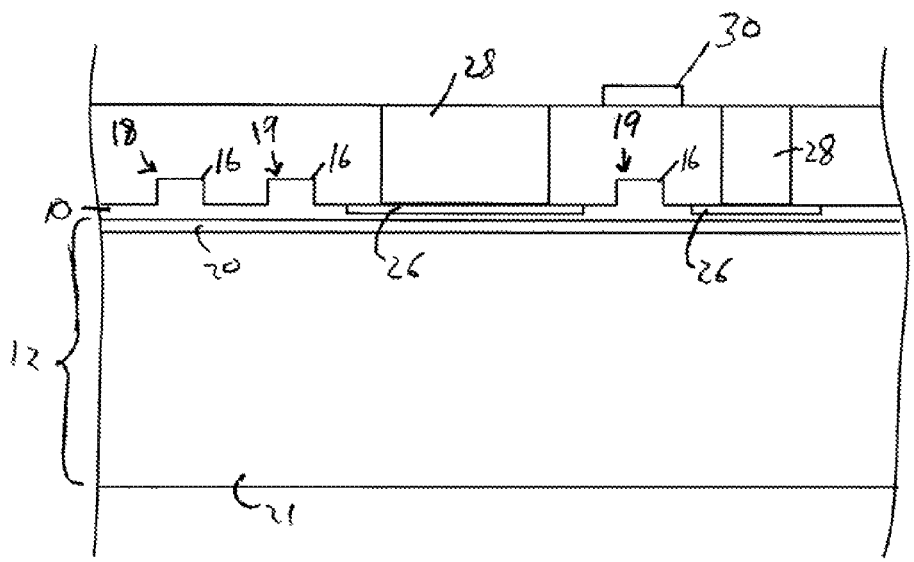

FIG. 1A and FIG. 1B illustrate all or a portion of an optical device that includes an intensity modulator. FIG. 1A is a perspective view of the optical device or of a portion of the optical device. To simplify FIG. 1A, the uppermost and front edge of the device is only partially illustrated to prevent confusion between this edge and the components that are positioned behind this edge in FIG. 1A. FIG. 1B is a cross section of the optical device shown in FIG. 1A taken along a vertical plane extending through the device of FIG. 1A as shown by the brackets labeled A and the associated dashed lines. The cross-section of FIG. 1B is taken looking in the direction of the arrows on the brackets labeled A.

The device includes a light-transmitting medium 10 positioned on a base 12. A suitable light-transmitting medium 10 includes, but is not limited to, semiconductors such as silicon. The light-transmitting medium 10 includes ridges 16 extending from a slab 17 of the light-transmitting medium 10. The ridges 16 and the base 12 each define portions of the light signal-carrying regions of a loop waveguide 19 and a bus waveguide which is also called an input/output waveguide. The light signal-carrying regions are the regions of the waveguides where the fundamental mode and the higher order modes are guided. For instance, the materials that contact the ridges 16 can have an index of refraction less than the index of refraction of the light-transmitting medium 10. The reduced index of refraction reflects light signals from the ridge 16 back into the ridge 16. Additionally, the portion of the base 12 contacting the light-transmitting medium 10 under the ridge 16 can have an index of refraction less than the index of refraction of the light-transmitting medium 10. The reduced index of refraction reflects light signals from the light-transmitting medium 10 back into the light-transmitting medium 10. As a result, the fundamental mode and the higher order modes are constrained within the light signal-carrying region of the loop waveguide 19 and the bus waveguide.

The base 12 illustrated in FIG. 1B includes an insulator 20 positioned over a substrate 21. When the light-transmitting medium 10 is silicon, a suitable insulator 20 includes, but is not limited to, silica and a suitable substrate 21 includes a silicon substrate. A silicon-on-insulator wafer is a suitable platform for an optical device having a silicon light-transmitting medium 10 positioned over a base 12 having a silica insulator 20 and a silicon substrate 21.

An upper medium 22 is positioned on the light-transmitting medium. The upper medium 22 can include one or more layers. Suitable materials for the layers include, but are not limited to, low K dielectrics such as silica, and/or silicon nitride. One or more of the layers can be selected to provide optical and/or electrical confinement. For instance, as noted above, the layer of the in contact with the light-transmitting medium or ridges can provide optical confinement by having an index of refraction that is less than the index of refraction of the light-transmitting medium.

During operation of the intensity modulator, the bus waveguide guides an input light signal to a region where the loop waveguide 19 is optically coupled with the bus waveguide. The bus waveguide also carries an output light signal away from the region where the loop waveguide 19 is optically coupled with the bus waveguide. Accordingly, a first portion of the input light signal enters the loop waveguide 19 where it serves as a loop light signal. A second portion of the input light signal travels past the ring waveguide and is included in the output light signal. When the phase difference between the loop light signal and the second portion of the input light signal is $n*2*\pi$ (n is an integer), there is constructive interference between the second portion of the input light signal and the loop light signal. As a result of the constructive interference, a larger portion of the input light signal enters the loop waveguide 19 from the bus waveguide. Accordingly, the constructive interference causes the intensity of the second portion of the input light signal to decrease and accordingly causes the intensity of the output signal to decrease. When the phase difference between the loop light signal and the second portion of the input light signal is not $n*2$, the constructive interference does not occur and the intensity of the output light signal does not experience the drop associated with the constructive interference.

The device includes a phase modulator configured to modulate the phase difference between the second portion of the input light signal and the loop light signal. The phase modulator includes doped regions 26 formed in the first light-transmitting medium 10 on opposing sides of the ridge for the loop waveguide 19. Each of the doped regions 26 can be an N-type doped regions or a P-type doped region. For instance, each of the N-type doped regions can include an N-type dopant and each of the P-type doped regions can include a P-type dopant. In some instances, the phase modulator includes a doped region that is an N-type doped region and the doped region on the opposing side of the ridge is a P-type doped region.

Suitable dopants for N-type regions include, but are not limited to, phosphorus and/or arsenic. Suitable dopants for P-type regions include, but are not limited to, boron. A suitable concentration for the P-type dopant in a P-type doped region includes, but is not limited to, concentrations greater than $1\times10^{16}$ $cm^{-3}$ and/or less then $1\times10^{21}$ $cm^{-3}$. A suitable concentration for the N-type dopant in an N-type doped region includes, but is not limited to, concentrations greater than $1\times10^{16}$ $cm^{-3}$ and/or less then $1\times10^{21}$ $cm^{-3}$.

An electrical conductor 28 extends through the upper medium into contact with each one of the doped regions 26. Suitable electrical conductors 28 include, but are not limited to, metals. The device can be used in conjunction with electronics that are in electrical communication with the electrical conductors. The electronics can apply electrical energy across the doped regions 26 so as to inject charge carriers into the first light-transmitting medium between the doped regions 26 and accordingly into the light signal-carrying region of the loop waveguide 19. A charge carrier is a free (mobile and/or unbound) particle carrying an electric charge. Examples are electrons and ions. The travelling vacancies in the valence-band electron population (holes) are treated as charge carriers.

The presence of charge carriers in the light signal-carrying region of the loop waveguide 19 changes the index of refraction of the light signal-carrying region of the loop waveguide 19 and accordingly changes the speed at which the second portion of the input light signal travels through the loop waveguide 19. Accordingly, the phase modulator can be used to change the phase difference between the first portion of the light signal and the second portion of the input light signal. For instance, the phase modulator can be used to provide an $n*2*\pi$ phase differential between the first portion of the light signal and the second portion of the input light signal and accordingly decrease the intensity of the output light signal from the bus waveguide. As a result, the phase modulator can be used to control the intensity of the output light signal. Accordingly, the phase modulation results in the intensity modulation of the output light signal.

The phase modulator illustrated in FIG. 1A and FIG. 1B is a PIN type phase modulator because it has an insulator (the undoped first light-transmitting medium) contacting a p-type doped region and an n-type doped region without the p-type doped region contacting the n-type doped region. In some instances, the insulator of a PIN type phase modulator can be a non-doped semiconductor material or can be a semiconductor material that is lightly doped when compared to the p-type doped region and an n-type doped region. Suitable semiconductor materials include silicon.

Although FIG. 1A and FIG. 1B illustrate the phase modulator as a PIN type phase modulator, other types of phase modulators can be employed. An example of a suitable phase modulator that provides high speed phase modulation a phase modulator that has an N-type doped region with a proximity to a P-type doped region that causes a depletion region to form when a bias is not applied to the modulator. The depletion region is at least partially positioned in the light signal-carrying region of the loop waveguide 19. Examples of suitable depletion region based phase modulators are disclosed in U.S. patent application Ser. No. 11/146,898; filed on Jun. 7, 2005; entitled "High Speed Optical Phase Modulator;" and incorporated herein in its entirety and also in U.S. patent application Ser. No. 11/147,403; filed on Jun. 7, 2005; entitled "High Speed Optical Intensity Modulator;" and incorporated herein in its entirety.

Another example of a suitable phase modulator that provides high-speed phase modulation has a bipolar junction transistor formed in the first light-transmitting medium. The bipolar junction transistor is positioned such that causing electrical current to flow through the transistor causes charge carriers to flow through the light signal-carrying region of the loop waveguide 19. In some instances, the bipolar junction transistor includes three primary doped regions of the light-transmitting medium. Each of the primary doped regions contacts one or more of the other primary doped regions but two of the doped primary regions do not contact one another. At least one of the primary doped regions is positioned in the light signal-carrying region of the loop waveguide 19. The primary doped regions can include a first doped region that is the only one of the primary doped regions positioned in the light signal-carrying region of the loop waveguide 19. In some instances, the light signal-carrying region of the loop waveguide 19 does not extend outside of the first doped region. In some instances, the electronics are configured to operate the bipolar junction transistor such that one of the primary doped regions act as a collector for the transistor, one of the primary doped regions act as a base for the transistor, and one of the primary doped regions act as an emitter for the transistor. The first doped region can be the primary doped region that acts as the collector. An example of a suitable phase modulator having a bipolar junction transistor is disclosed in U.S. Provisional Patent Application Ser. No. 61/132,151; filed on Jun. 16, 2008; entitled "High Speed Optical Modulator;" and incorporated herein in its entirety.

The device includes a bandwidth-shifting device configured to tune the selection of wavelengths that falls within each of the phase modulator bandwidths. For instance, the device can include a temperature control device configured to heat and/or cool the intensity modulator or one or more locations on the intensity modulator. For instance, a suitable temperature control device can be configured to heat and/or cool one or more locations on the bus waveguide and/or the loop waveguide 19. The device of FIG. 1A and FIG. 1B includes a resistive heater or resistive heating element 30 configured to heat the intensity modulator. The electronics can be in electrical communication with the temperature control device and can be configured to use the temperature control device to change and/or control the temperature of one or more locations on the intensity modulator. For instance, the electronics can be in electrical communication with contact points 32 positioned at opposing ends of the resistive heating element 30 shown in FIG. 1A and FIG. 1B. The electronics can drive an electrical current between the contact points of the resistive heater in order to cause heat generation from the resistive heater. Heat generated by the resistive heating element will be received by at least portions of the loop waveguide and will accordingly alter the index of refraction of the loop waveguide.

Although not shown, the device can optionally include one or more temperature sensors in electrical communication with the electronics. The electronics can employ the output from the one or more temperature sensors in a feedback loop to keep the intensity modulator at a particular temperature.

Figure 2A:
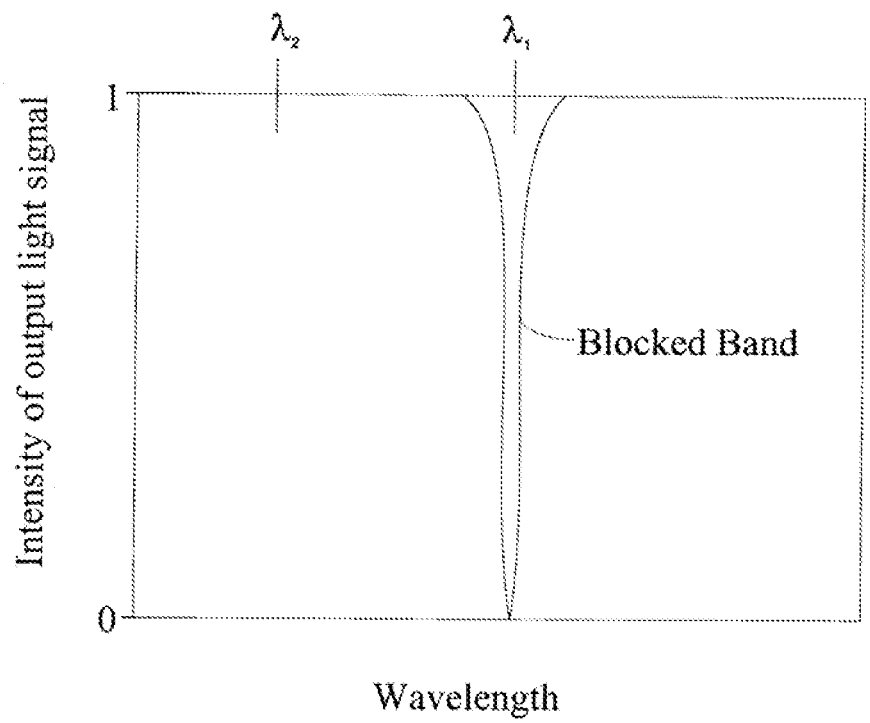
FIG. 2A illustrates the intensity of the output signal versus wavelength for a ring resonator. The curve shown in FIG. 2A shows a blocked band between passbands for the ring resonator when it is in a particular state.

Changing the temperature of the intensity modulator shifts the bandwidth of the intensity modulator. The range of wavelengths that can be intensity modulated by the intensity modulator is the bandwidth of the intensity modulator. For instance, FIG. 2A illustrates the intensity of the output signal versus wavelength for an intensity modulator. The curve shown in FIG. 2A shows a blocked band between passbands for the intensity modulator when it is in a particular state. For instance, the curve shown in FIG. 2A shows passbands and a blocked band for the intensity modulator when the intensity modulator is at a particular temperature and the phase modulator is operated to provide a particular phase differential between the first portion of the light signal and the second portion of the input light signal. The curve in FIG. 2A shows that in this state, if the intensity modulator received an input light signal with having wavelength $\lambda_1$, the intensity modulator would provide an output light signals with an intensity of 0. However, the intensity modulator would provide an output light signals with an intensity of 1 if the input light signal with had a wavelength $\lambda_2$.

Each of the blocked bands is a peak in the FIG. 2A profile that includes a blocked wavelength and is associated with the blocked wavelength. The blocked wavelength is the wavelength in the blocked band where the intensity of the output light signal is minimized. Accordingly, the wavelength labeled $\lambda_1$ in FIG. 2A is the blocked wavelength associated with the blocked band shown in FIG. 2A.

Figure 2B:
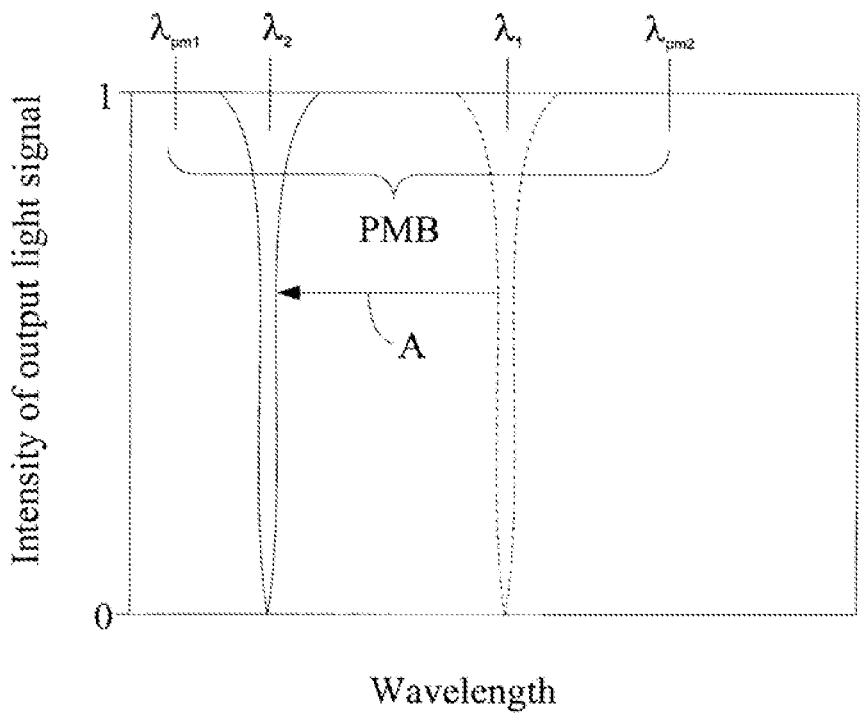
FIG. 2B illustrates the results of employing the phase modulator to shift the blocked band from the location shown in FIG. 2A to the location illustrated by the arrow labeled A.

The phase modulator can be employed to shift the selection of wavelengths included in the blocked band without substantially affecting the range of wavelengths included in the blocked band. For instance, FIG. 2B illustrates the results of employing the phase modulator to shift the blocked band from the location shown in FIG. 2A to the location illustrated by the arrow labeled A. The shift in the blocked band changed the selection of wavelengths included in the blocked band. However, the range of wavelengths included in the blocked band is not substantially changed. As a result, if the intensity modulator received an input light signal with having wavelength $\lambda_1$, and the phase modulator was operated according to FIG. 2A, the intensity modulator would provide an output light signals with $\lambda_1$ having an intensity of 0. If the phase modulator was then operated so as to shift the blocked band as shown in FIG. 2B, the intensity modulator would provide an output light signals with $\lambda_1$ having an intensity of 1.

The level of the shift in the blocked bands that can be achieved with the phase modulator is limited. As an example, when the intensity modulator is at a particular temperature, the phase modulator may not be able to properly shift the blocked band beyond a phase modulated band extending from the wavelength labeled $\lambda_{pm1}$ to the wavelengths labeled $\lambda_{pm2}$ in FIG. 2B. The distance between the wavelengths labeled $\lambda_{pm1}$ or the wavelengths labeled $\lambda_{pm2}$ in FIG. 2B is the phase modulator bandwidth (PMB). The phase modulator bandwidth represents the range of wavelengths for which intensity modulation can be effectively achieved with only the phase modulator. Accordingly, the blocked band is associated with a phase-modulated band of wavelengths and a phase-modulated bandwidth (PMB).

Employing the temperature control device to change the temperature of the intensity modulator also shifts the selection of wavelengths included in the blocked band without substantially affecting the range of wavelengths included in the blocked band. The shift in the blocked band that is achieved with the temperature control device is generally at a slower speed than can be achieved with the phase modulator.

Figure 2C:
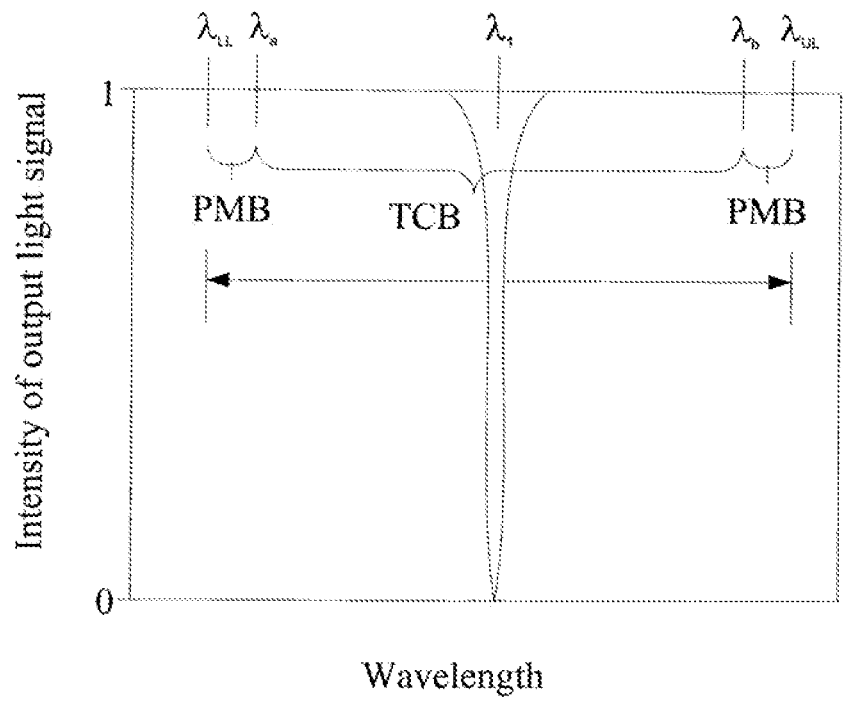
FIG. 2C illustrates a range of wavelengths over which a temperature control device may be able to shift a blocked band without using the phase modulator (the temperature controlled bandwidth (TCB)).

The level of the shift in the blocked bands that can be achieved with only a temperature control device is limited. As an example, without using the phase modulator, the temperature control device may not be able to shift the blocked band beyond a temperature shifted band extending from the wavelength labeled $\lambda_a$ to the wavelengths labeled $\lambda_b$ in FIG. 2C. The distance between the wavelengths labeled $\lambda_a$ and the wavelengths labeled $\lambda_b$ in FIG. 2C is the temperature controlled bandwidth (TCB) of the intensity modulator. For instance, the temperature-controlled bandwidth (TCB) represents the range of wavelengths to which the temperature control device can shift the blocked band. Accordingly, the blocked band is associated with a temperature-shifted band of wavelengths and a temperature-controlled bandwidth (TCB).

The temperature control device can be used to increase the bandwidth of the intensity modulator above the phase modulator bandwidth. For instance, the temperature control device can be use to shift the blocked band to a wavelength where the phase modulator can modulate a particular wavelength. To illustrate this point, FIG. 2C shows a wavelength at $\lambda_{LL}$. The wavelength at $\lambda_{LL}$ represents the lowest wavelengths that can be intensity modulated by using the phase modulator when the temperature control device is operated so as to shift the blocked band to $\lambda_a$. Accordingly, $\lambda_{LL}$ is between $\lambda_a$–PMB and $\lambda_a$+PMB depending on the construction of the phase modulator. For the purposes of illustration $\lambda_{LL}$ is shown at $\lambda_a$–PMB. FIG. 2C also shows a wavelength at $\lambda_{UL}$. The wavelength at $\lambda_{UL}$ represents the highest wavelengths that can be intensity modulated by using the phase modulator when the temperature control device is operated so as to shift the blocked band to $\lambda_b$. Accordingly, the $\lambda_{UL}$ is between $\lambda_b$–PMB and $\lambda_b$+PMB depending of the construction of the phase modulator. For the purposes of illustration $\lambda_{UL}$ is shown at $\lambda_a$+PMB. As a result, by using both the temperature control device and the phase modulator, the intensity modulator can intensity modulate light signals having wavelengths in an intensity modulation band between $\lambda_{LL}$ and $\lambda_{UL}$. Accordingly, the intensity modulator bandwidth is $\lambda_{UL}$-$\lambda_{LL}$. In general, the intensity modulator bandwidth is about the same for each blocked band and each blocked wavelength. As a result, each of the blocked bands and blocked wavelengths are associated with an intensity modulation band of wavelengths and an intensity modulator bandwidth (TCB). Since the intensity modulation band is a result of the limits of the phase modulator and the bandwidth shifting device, the selection of wavelengths in the intensity modulation bands generally do not shift and the intensity modulation bandwidth generally does not change size.

Figure 2D:
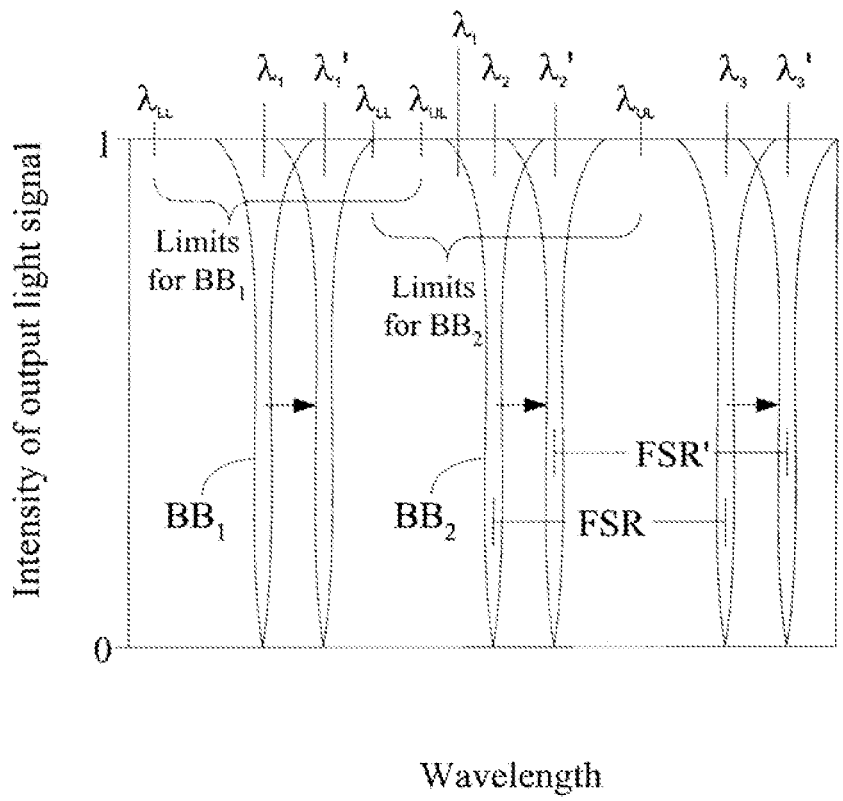
FIG. 2D illustrates blocked bands with a substantially constant wavelength separation between neighboring blocked bands and also between neighboring blocked wavelengths.

As noted above, the constructive interference associated with the blocked bands occurs when the phase difference between the first portion of the light signal and the light second portion of the input light signal is $n*2*\pi$ where n is an integer. The presence of the integer n in this equation means that this constructive interference can be achieved for a variety of different n values that are spaced by a phase differential of $2*\pi$. As a result, the blocked bands are periodic as illustrated in FIG. 2D.

The distance between the blocked bands is periodic and is known as the free spectral range (FSR). Changing the temperature of the intensity modulator shifts the location of the blocked bands without substantially changing the free spectral range (FSR). For instance, changing the temperature of the intensity modulator can shift the blocked bands as shown by the arrows in FIG. 2D while substantially retaining the same free spectral range as shown by the labels FSR and FSR'. As a result, the temperature control device can be employed to shift the selection of wavelengths that fall within the blocked bands without substantially changing the distance between these blocked bands.

Once the temperature control device is employed to shift the blocked bands to a location on the wavelength spectrum, the phase modulator can then be used to modulate light signals having wavelengths within the PMB associated with each of the blocked bands. For instance, after using the temperature control device to cause the shift illustrated in FIG. 2D, the phase modulator can be used to modulate the light signals labeled $\lambda_1'$, $\lambda_2'$, and/or $\lambda_3'$.

The electronics are configured to tune the blocked bands (or blocked wavelengths) so more than one of the blocked bands is used to modulate the light signals. As noted above, a blocked band is associated with an intensity modulation band extending from between $\lambda_{LL}$ and $\lambda_{UL}$. The ability of the electronics to use more than one of the blocked bands increases the bandwidth for the intensity modulator beyond $\lambda_{UL}$-$\lambda_{LL}$. For instance, FIG. 2D shows the wavelengths $\lambda_{LL}$ and $\lambda_{UL}$ that are associated with a first one of the blocked bands labeled $BB_1$ and a second one of the blocked bands labeled $BB_2$. FIG. 2D also shows a target wavelength labeled $\lambda_t$. The target wavelength $\lambda_t$ is located outside of the range of wavelengths defined by the range of $\lambda_{LL}$ to $\lambda_{UL}$ for the blocked band labeled $BB_1$. As a result, if $\lambda_t$ represents the target wavelength of a target light signal that is to be intensity modulated, the blocked bands labeled $BB_1$ cannot be shifted to include $\lambda_t$. Accordingly, the blocked band labeled $BB_1$ could not be used to intensity modulate the light signal at the target wavelength $\lambda_t$.

Figure 2E:
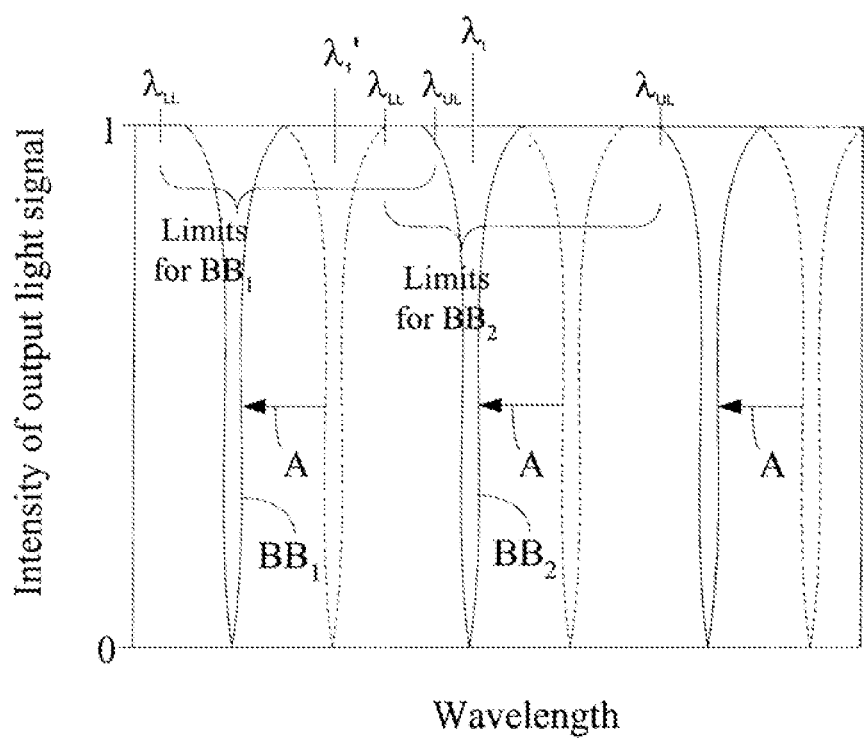
FIG. 2E illustrates use of a temperature control device to shift the blocked bands from FIG. 2D.

Because the first blocked band labeled $BB_1$ cannot not be used to intensity modulate the light signal at $\lambda_t$ and the electronics can use other blocked bands to intensity modulate the light signal, the electronics can operate the temperature control device such that the wavelength of the target light signal is within another one of the blocked bands. For instance, FIG. 2E shows the blocked bands from FIG. 2D in dashed lines shifted according to the arrows labeled A. The blocked bands are shifted such that the second blocked band ($BB_2$) includes the target wavelength ($\lambda_t$) of the target light signal. As a result, the light signal labeled $\lambda_t$ can by intensity modulated using the first blocked band ($BB_1$) and then the electronics can use the temperature control device to shift the blocked bands such that the target light signal can be intensity modulated using the second blocked band ($BB_2$). This ability of the phase modulator to intensity modulate the target light signal is a result of the electronics being able to use more than one of the blocked bands to intensity modulate a target wavelength.

Figure 2F:
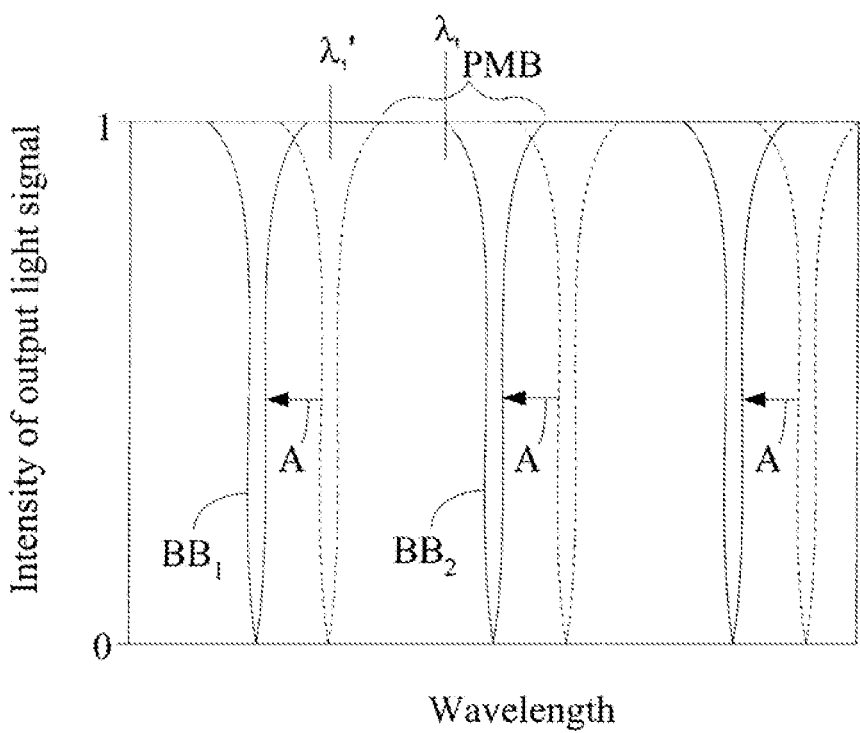
FIG. 2F illustrates use of a temperature control device to shift the blocked bands from FIG. 2D.

Although FIG. 2E shows the blocked bands shifted such that the second blocked band ($BB_2$) is centered over the target wavelength $\lambda_t$, the blocked bands need only be shifted such that the target wavelength $\lambda_t$ falls within the phase modulator band associated with the second blocked band ($BB_2$). For instance, FIG. 2F illustrates the blocked bands from FIG. 2D in dashed lines shifted according to the arrows labeled A. The temperature control device can be operated so as to shift the blocked bands such that the target wavelength is within the phase modulator band (PMB) associated with the second blocked band ($BB_2$). As a result, once the blocked bands are shifted as shown in FIG. 2E, the phase modulator can be operated to shift the second blocked band ($BB_2$) so it includes the target wavelength $\lambda_t$ or excludes the target wavelength $\lambda_t$. As a result, once the temperature control device is operated so as to shift the blocked bands as shown in FIG. 2F, the phase modulator can be used to intensity modulate the target light signal.

As is evident in FIG. 2D, the intensity modulator bandwidth ($\lambda_{UL}$-$\lambda_{LL}$) exceeds the Free Spectral Range (FSR). This feature allows the intensity modulator bands associated with adjacent blocked bands to overlap one another. As a result, the range of wavelengths that can be intensity modulated by the intensity modulator is continuous and unbroken even when different block bands are employed to modulate the light signals.

Figure 3:
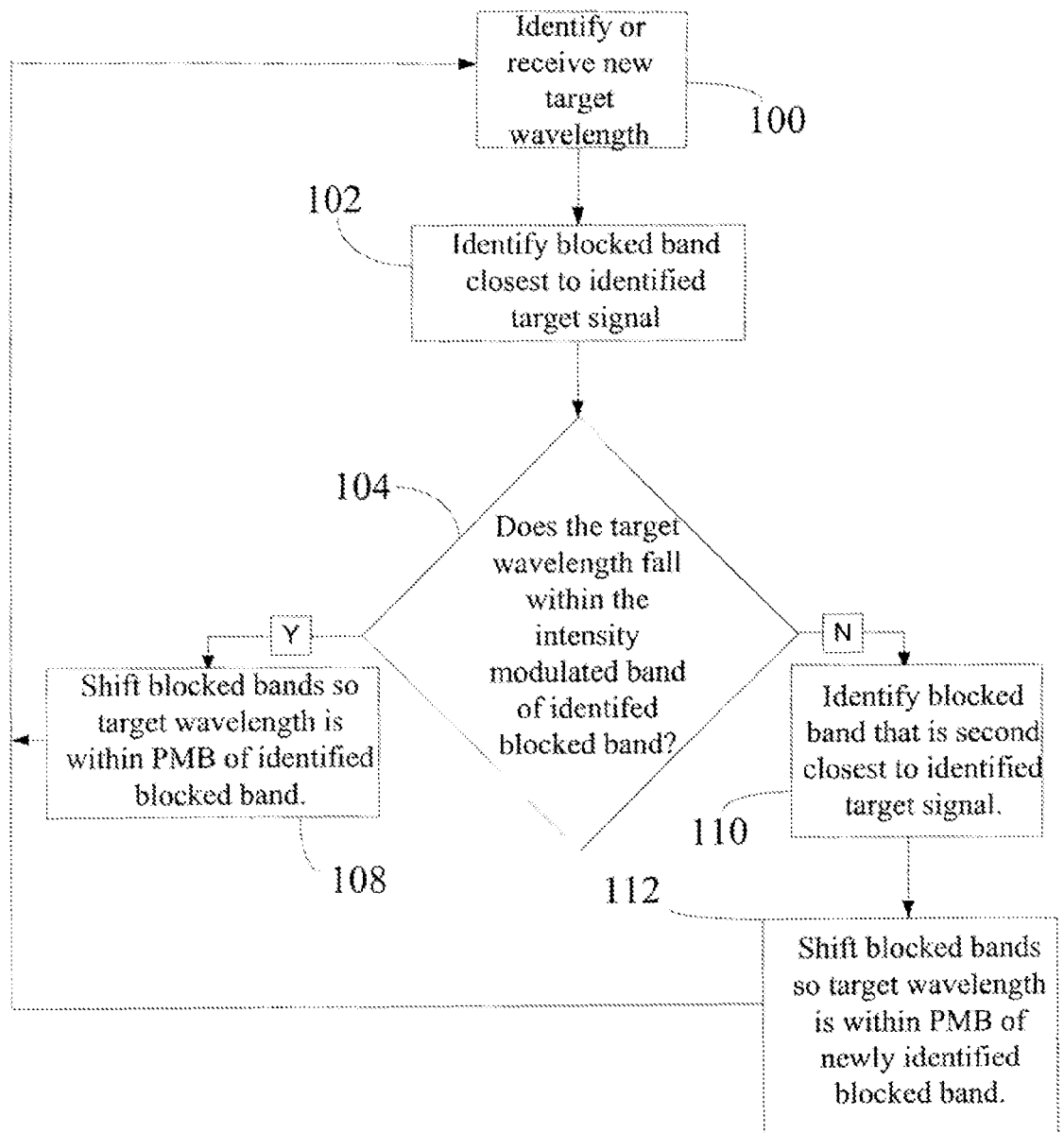
FIG. 3 illustrates a method of operating the intensity modulator.

FIG. 3 illustrates a method of operating the intensity modulator. The electronics can operate the phase modulator according to FIG. 3. At process block 100, the electronics identify the target wavelength of a target light signal that is to be modulated by the intensity modulator. The target wavelength can be stored in a memory or entered into the electronics using a user interface such as a keyboard or mouse. At process block 102, the electronics identify the blocked band or blocked wavelength at the wavelength that is closest to wavelength of the target light signal.

At determination block 104, the electronics determine whether the target wavelength falls within the intensity-modulated band associated with the blocked band or blocked wavelength identified at process block 102. In the event that the determination is positive, the method proceeds to process block 108 where the electronics operate the temperature control device so as to shift the blocked bands or blocked wavelengths such that the target wavelength $\lambda_t$ falls within the phase modulator band associated with the blocked band or blocked wavelength identified at process block 102. If the determination is negative, the method proceeds to process block 110 where the electronics identify the blocked band or blocked wavelength that is closest to the target wavelength after the blocked band or blocked wavelength identified at process block 102. At process block 112, the electronics operate the temperature control device so as to shift the blocked bands or blocked wavelengths such that the target wavelength $\lambda_t$ falls within the phase modulator band associated with the blocked band or blocked wavelength identified at process block 110.

This method described in FIG. 3 can result in different blocked bands or blocked wavelengths being used to modulate the same target signal. However, since the blocked band or blocked wavelength that is closest to the target light signal is used, the method results in an efficient selection of the blocked band or blocked wavelength that will be used to intensity modulate the output light signal. Other schemes can be used to select the blocked band or blocked wavelength that will be used to intensity modulate the output light signal. For instance, the electronics can store data associated target wavelengths with particular blocked bands or blocked wavelengths. When the electronics identify the target wavelength, they can then tune the temperature control device such that the blocked band or blocked wavelength associated with the target wavelength is used to intensity modulate the output light signal.

Suitable electronics for executing the method illustrated in FIG. 3 can include a controller. A suitable controller includes, but is not limited to, a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions attributed to the electronics. A general-purpose processor may be a microprocessor, but in the alternative, the controller may include or consist of any conventional processor, microcontroller, or state machine. A controller may also be implemented as a combination of computing devices, e.g., a combination of a DSP and a microprocessor, a plurality of microprocessors, one or more microprocessors in conjunction with a DSP core, or any other such configuration.

The electronics can optionally include a memory in communication with the controller. The electronics can store data for executing the functions of the electronics in the memory. The memory can be any memory device or combination of memory devices suitable for read and/or write operations.

In some instances, the electronics include a computer-readable medium in communication with the controller. The computer-readable medium can have a set of instructions to be executed by the controller. The controller can read and execute instructions included on the computer-readable medium. The controller executes the instructions such that the electronics perform one or more of the described functions. The computer-readable medium cab be different from the memory or can be the same as the memory. Suitable computer-readable media include, but are not limited to, optical discs such as CDs, magnetic storage diskettes, Zip disks, magnetic tapes, RAMs, and ROMs. Some functions of the electronics may be executed using hardware as opposed to executing these functions in firmware and/or software.

Although the loop waveguide is shown as a ring or circle, the loop waveguide can have other closed loop configurations such as oval, elliptical, etc.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A method of modulating intensity of a light signal in a waveguide, comprising:
obtaining an optical intensity modulator including
a bus waveguide configured to carry an input light signal to a location where the bus waveguide is optically coupled with a loop waveguide,
the bus waveguide being optically coupled with the loop waveguide such that at least a portion of the input light signal can enter the loop waveguide and serve as a loop light signal,
the bus waveguide also being configured to carry an output light signal away from the location where the bus waveguide is optically coupled with the loop waveguide;
a phase modulator for phase modulating a phase difference between the loop light signal and the input light signal,
the phase modulator configured to modulate the phase differences such that blocked wavelengths are tuned within phase modulator bandwidths where each of the blocked wavelengths is tuned within a different one of the phase modulator bandwidths, and
the blocked wavelengths being wavelengths at which the intensity of the output light signal is minimized; and
shifting the phase modulator bandwidths from a first configuration where a first target wavelength falls within a first one of the phase modulator bandwidths and a second target wavelength does not fall within a second one of the phase modulation bandwidth to a second configuration where the second target wavelength falls within the second phase modulator bandwidth, the first phase modulator bandwidth being different from the second phase modulator bandwidth.

2. The method of claim 1, wherein the intensity modulator includes a bandwidth shifting device configured to shift a selection of wavelengths that falls within each of the phase modulator bandwidths.

3. The method of claim 2, wherein shifting the phase modulator bandwidths includes operating the bandwidth shifting device.

4. The method of claim 3, wherein the bandwidth shifting device is a device configured to heat and/or cool one or more locations in the loop waveguide and/or the bus waveguide.

5. The method of claim 1, wherein none of the phase modulator bandwidths overlap one another.

6. The modulator of claim 1, wherein a wavelength difference between each of the blocked wavelengths and the one or more nearest blocked wavelength is substantially constant.

7. The method of claim 1, further comprising:
identifying a target wavelength to be intensity modulated; and
identifying the blocked wavelength closest to the identified target wavelength.

8. The method of claim 1, wherein
the phase modulator and the bandwidth shifting device allow each blocked wavelength to intensity modulate wavelengths in an intensity modulation band and the intensity modulate bands for different blocked wavelengths overlap;
and further comprising:
identifying a target wavelength to be intensity modulated;
identifying the blocked wavelength closest to the identified target wavelength; and
determining if the target wavelength falls within the intensity modulation band for the identified blocked wavelength.

9. The method of claim 1, wherein the phase modulator concurrently tunes the blocked wavelengths within the phase modulator bandwidths.

10. The method of claim 9, wherein the blocked wavelengths are periodically located along the wavelength spectrum.

11. The method of claim 1, wherein the phase modulator bandwidths are each a total range of wavelengths over which the phase modulator can shift one of the blocked wavelengths.

12. The method of claim 11, wherein the second target wavelength does not fall within the first phase modulation bandwidth when the phase modulator bandwidths are in the first configuration.

13. The method of claim 12, wherein the first target wavelength does not fall within the first phase modulation bandwidth when the phase modulator bandwidths are in the second configuration.

14. The method of claim 11, wherein the second phase modulation bandwidth is the phase modulation bandwith that is closest to the second target wavelength when the phase modulator bandwidths are in the first configuration.

15. The method of claim 11, wherein the second phase modulation bandwidth is the phase modulation bandwith that is second closest to the second target wavelength when the phase modulator bandwidths are in the first configuration.

16. The method of claim 1, wherein the first target wavelength is the wavelength to be modulated when the phase modulator bandwidths are in the first configuration and the second target wavelength is the wavelength to be modulated when the phase modulator bandwidths are in the second configuration.

17. The method of claim 1, further comprising:
employing the phase modulator to modulate light at the first target wavelength when the phase modulator bandwidths are in the first configuration; and
employing the phase modulator to modulate light at the second target wavelength when the phase modulator bandwidths are in the second configuration.

18. The method of claim 17, further comprising:
employing the phase modulator to shift the blocked wavelength within the second phase modulator bandwidth to the second target wavelength before employing the phase modulator to modulate light at the second target wavelength.

* * * * *